United States Patent [19]

Stewart

[11] Patent Number: 4,699,567

[45] Date of Patent: Oct. 13, 1987

[54] FAN DUCT CASING

[75] Inventor: Ian F. Stewart, Derby, England

[73] Assignee: Rolls-Royce plc, London, England

[21] Appl. No.: 948,431

[22] Filed: Dec. 31, 1986

Related U.S. Application Data

[63] Continuation of Ser. No. 717,140, Mar. 28, 1985, abandoned.

[30] Foreign Application Priority Data

Jun. 7, 1984 [GB] United Kingdom ............... 8414510

[51] Int. Cl.⁴ .............................................. F01D 1/02
[52] U.S. Cl. .................................. 415/200; 415/219 R
[58] Field of Search ............... 415/9, 119, 219 R, 197, 415/121 G, 108, 128, 196, 200; 416/230 R, 218, 190, 192; 60/909

[56] References Cited

U.S. PATENT DOCUMENTS

| | | | |
|---|---|---|---|
| 3,602,602 | 8/1971 | Motta | 415/9 |
| 3,974,313 | 8/1976 | James | 415/9 |
| 4,057,359 | 11/1977 | Grooman | 415/9 |
| 4,377,370 | 3/1983 | Porcelli | 415/9 |
| 4,411,589 | 10/1983 | Joubert et al. | 415/9 |
| 4,425,080 | 1/1984 | Stanton et al. | 415/197 |
| 4,452,563 | 6/1984 | Belanger et al. | 415/197 |
| 4,452,565 | 6/1984 | Monhardt et al. | 415/197 |
| 4,534,698 | 8/1985 | Tomich | 415/200 |

FOREIGN PATENT DOCUMENTS

| | | |
|---|---|---|
| 30179A | 6/1981 | European Pat. Off. . |
| 128819 | 12/1984 | European Pat. Off. . |
| 2037900 | 12/1978 | United Kingdom ............ 415/219 R |
| 2112349 | 7/1983 | United Kingdom . |

Primary Examiner—Carlton R. Croyle
Assistant Examiner—Donald E. Stout
Attorney, Agent, or Firm—Cushman, Darby & Cushman

[57] ABSTRACT

A containment ring for a gas turbine engine fan duct comprises a rigid cylinder the periphery of which is covered with layers of fibrous material consisting of a plurality of pieces of woven material, around which is wound a further plurality of continuous layers of woven fibrous material which is then covered with a further impervious layer.

9 Claims, 3 Drawing Figures

FAN DUCT CASING

This is a continuation of application Ser. No. 717,140, filed Mar. 28, 1985, which was abandoned upon the filing hereof.

This invention relates to gas turbine engine fan duct casings and more particularly to an improved containment ring for use within or forming a part of the fan duct casing.

The use of containment rings for gas turbine engine casings has been known for many years. It is necessary to provide containment rings such that in the event of a blade or other rotating part of the engine becoming detached, such parts or blades will be prevented from passing through the engine casing by means of the containment ring, thus reducing the possibility of damage to the remainder of the aircraft or engine structure.

Containment rings have in the past been manufactured from metal or alternatively resin impregnated glass fibre or carbon fibre etc., and have usually formed an integral part of the compressor casing. Such rings have suffered several disadvantages, in particular metal rings have to be manufactured from relatively thick section material to ensure that they have adequate strength. This obviously results in a heavy structure which is particularly undesirable in the case of an aircraft gas turbine engine. Obviously composite material containment rings are much lighter then metal ones, however because of the presence of the resin, energy absorption is confined to a localised area around the impact point with the result that only a small part of the fibres in the ring actually takes the shock of the impact.

Containment rings have also been used consisting of a relatively thin section rigid cylinder around which is wound a plurality of layers of woven fibrous material. Such rings have proved quite effective and it is believed that this is because of the systems ability to transmit the shock of the impact over a much greater area of the structure after the missile has penetrated the thin section cylinder than in the other types of containment rings. This is because the layers of woven fibrous material may move relative to each other, thus transmitting the loading such that it is carried through a major portion of the structure, the shock thus being absorbed by the elasticity of the woven fibrous material.

This system however has suffered a disadvantage in that occasionally it has been known for a released portion of a gas turbine fan blade to pass completely through the relatively thin section cylinder, and thereafter cut through the layers of fibrous material such that it is not contained within the system.

The object of the present invention is to provide a containment ring for a gas turbine engine in which the aforementioned disadvantage is substantially eliminated.

According to the present invention a containment ring for a gas turbine engine comprises a substantially rigid cylinder, the outermost cylindrical surface of which is covered with layers of woven fibrous material, each of the layers consisting of a plurality of separate pieces of material and a further plurality of layers of woven fibrous material arranged over the first layers, which further layers are wound from a continuous length of material.

To facilitate the placing of the separate pieces of woven fibrous material upon the cylindrical surface, the pieces are secured together in the form of an elongate tape by means of a temporary or breakable fastening.

Preferably the temporary securing means or fastening comprises stitching.

Alternatively the temporary securing means or fastening comprises a backing layer to which the pieces of woven fibre material are secured.

Preferably the woven fibrous material comprises an aromatic polyamide fibre woven into an elongated tape.

Alternatively the woven fibre material comprises glass fibre, carbon fibre or metallic fibre which is woven into a tape.

Preferably the substantially rigid cylinder comprises a relatively thin section light-weight metal structure.

Alternatively the substantially rigid cylinder comprises a relatively thin section structure manufactured from a fibre reinforced resin material.

According to a further aspect of the present invention the plurality of layers of woven fibrous material are covered with an impervious layer of material which may comprise a resin layer or alternatively a metallic or non-metallic skin.

For better understanding of the invention, an embodiment thereof will be more particularly described by way of example only and with reference to the accompanying drawings in which.

Figure 1:
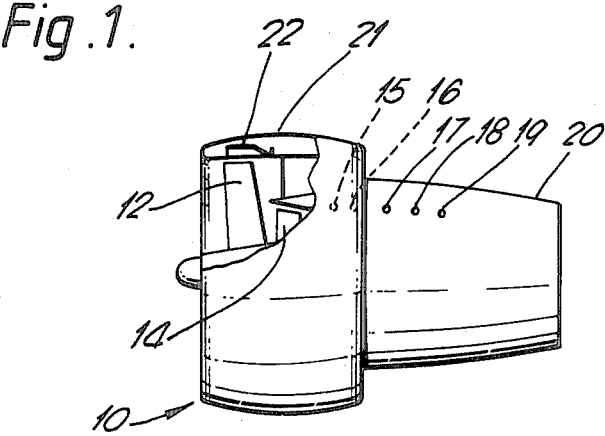
FIG. 1 shows a diagrammatic view of a ducted fan type gas turbine engine having a broken away casing portion disclosing a diagrammatic view of an embodiment of the present invention.
Figure 2:
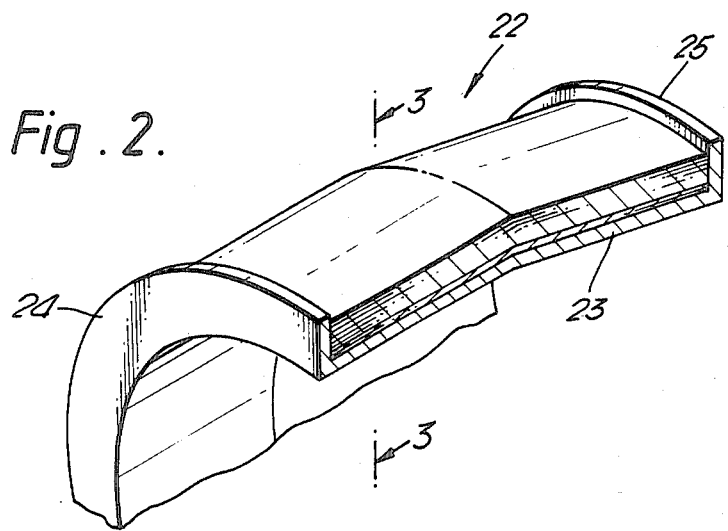
FIG. 2 shows an enlarged and more detailed cross-sectional view of the embodiment of the invention shown diagrammatically at FIG. 1.
Figure 3:
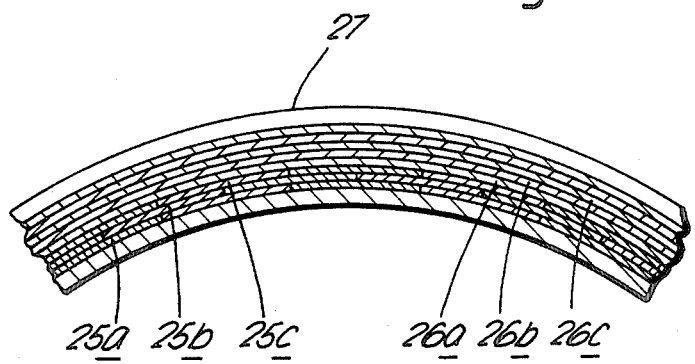
FIG. 3 shows a further cross-sectional view of the embodiment taken on line 3—3 at FIG. 2.

Referring to the drawings, the ducted fan type gas turbine engine shown generally at 10 comprises in flow series a fan 12, an intermediate pressure compressor 14, a high pressure compressor 15, combustion equipment 16, and high, intermediate and low pressure turbines indicated at 17, 18 and 19 respectively, the engine terminating in an exhaust nozzle 20.

Provided radially outwardly of the fan 12 is located a fan duct 21 which is connected to the remainder of the engine by radially extending struts not shown in the drawings. Within the fan duct 21 is provided a containment ring 22 arranged radially outwardly of the fan 12, the ring being located such that in the event of a blade or disc failure, the broken blade or disc portion, or portions will be contained within the engine casing, or alternatively the energy of the released portion will be reduced to an acceptable level.

The containment ring shown generally at 22 comprises a relatively thin section substantially rigid cylinder 23 including flanged ends 24 and 25. The cylinder may be manufactured from metal such as for example steel or aluminium or alternatively a fibre reinforced resin composite structure which may be manufactured by any of the well known weaving, winding or knitting techniques.

Arranged upon the radially outermost cylindrical surface of the cylinder 23 are disposed a plurality of layers of woven fibrous material 25a, 25b, 25c, each layer of which consists of several separate pieces of material. To assist in assembly of the respective separate pieces of woven fibrous material upon the cylinder 23, they may be secured together in the form of an elongated tape by means of stitching. Alternatively the separate pieces may be secured to a backing layer which may be paper or alternatively a relatively weak textile material. It will be appreciated that the stitching or backing merely serves to secure the respective portions together to facilitate assembly.

A plurality of further layers 26a, 26b, 26c etc. of woven material formed from a continuous length of material are thereafter wound over the layers 25a, 25b, 25c formed from the separate pieces. The outermost two material layers 26 may thereafter be secured together to maintain the assembly together by means of stitching. Alternatively the outermost layers 26 may be secured together by means of a plurality of pins which are secured to a common backing member. This may be located upon the partially wound structure prior to the last two turns of material. The pins will protrude through the final layers of material and may then be bent over to hold them in place.

The layers of woven or knitted fibrous material may be manufactured from an aromatic polyamide fibre. The fibre which appears most suitable for the present purposes is that made by Du Pont Limited and sold under the Registered Trademark KEVLAR.

An impervious layer of material 27 is provided over the completed assembly. This may consist of either a separate skin of metal or some suitable plastic sheet. Alternatively the impervious layer 27 may comprise a layer of resin which is either painted or sprayed on to the outermost layer of material 26.

During operation of a gas turbine engine including a containment ring made in accordance with the present invention, a released broken blade or disc portion contacts the cylinder 23 and passes through it. The portion then continues to travel radially outwardly carrying with it several of the separate portions of woven fibrous material contained in the layers 25. These separate pieces of material serve to wrap over the radially outermost portion of the blade or disc portion to form a pad such that the layers 26 are protected from sharp portions of the broken blade or disc which might normally cut through them. The layers therefor can serve to restrain the broken portion such that it is contained within the engine, the energy of the portion being absorbed by elastic deformation of the continuous woven tape.

It will be appreciated that the impervious material layer 27 is merely provided to protect the remainder of the containment structure from the ingress of water vapour, or oil etc. which can either affect its mechanical integrity or alternatively increase its weight.

I claim:

1. A containment ring for a gas turbine engine comprising:
    a substantially rigid cylinder having an outer most cylinder or surface;
    a plurality of layers of woven fibrous material positioned adjacent said outermost surface of the substantially rigid cylinder and each layer in the underlying portion comprising a plurality of circumferentially arranged discrete pieces of woven fibrous material positioned adjacent one another; and
    a further plurality of layers of woven fibrous material arranged over the first plurality of layers, said further layers being wound from a continuous length of material.

2. A containment ring as claimed in claim 1 in which the woven fibrous material comprises an aromatic polyamide fibre woven into an elongated tape.

3. A containment ring as claimed in claim 1 in which the woven fibrous material comprises, glass fibre, carbon fibre, or metallic fibre from which is woven an elongated tape.

4. A containment ring as claimed in claim 1 in which the substantially rigid cylinder comprises a relatively thin section light-weight metal structure.

5. A containment ring as claimed in claim 1 in which the substantially rigid cylinder comprises a relatively thin section structure manufactured from a fibre reinforced resin material.

6. A containment ring as claimed in claim 1 in which the plurality of layers of woven fibrous material are covered with an impervious layer of material comprising a metallic or non-metallic skin or alternatively a resin layer.

7. A containment ring for a gas turbine engine comprising:
    a substantially rigid cylinder having an outer most cylinder or surface;
    a plurality of layers of woven fibrous material positioned adjacent said outermost surface of the substantially rigid cylinder and each layer in the underlying portion comprising a plurality of circumferentially arranged pieces of material positioned adjacent one another;
    a further plurality of layers of woven fibrous material arranged over the first plurality of layers, said further layers being wound from a continuous length of material; and
    means for placing the pieces of woven fibrous material upon the cylindrical surface, the pieces being secured together in the form of an elongated tape by means of stitching.

8. A containment ring for a gas turbine engine comprising:
    a substantially rigid cylinder having an outer most cylinder or surface;
    a plurality of layers of woven fibrous material positioned adjacent said outermost surface of the substantially rigid cylinder and each layer in the underlying portion comprising a plurality of circumferentially arranged pieces of material positioned adjacent one another;
    a further plurality of layers of woven fibrous material arranged over the first plurality of layers, said further layers being wound from a continuous length of material; and
    means for placing the pieces of woven fibrous material upon the cylindrical surface, the pieces being secured together in the form of an elongated tape by a backing layer to which the pieces of woven fibrous material are secured.

9. A containment ring for a gas turbine engine comprising:
    a substantially rigid cylinder having an outermost cylinder or surface;
    a plurality of layers of woven fibrous material positioned adjacent said outermost surface of the substantially rigid cylinder and each layer in the underlying portion comprising a plurality of circumferentially arranged pieces of material positioned adjacent one another; and
    a further plurality of layers of woven fibrous material arranged over the first plurality of layers, said further layers being wound from a continuous length of material;
    wherein, to facilitate the placing of the pieces of woven fibrous material upon the cylindrical surface, said pieces are secured together in the form of an elongated tape by means of a temporary fastening.

* * * * *